United States Patent
Holbein et al.

(10) Patent No.: US 9,193,329 B2
(45) Date of Patent: Nov. 24, 2015

(54) POSITION DEVICE, PARTICULARLY FOR A BELT FEEDER, AND BELT LOCK DEVICE

(71) Applicant: TRW Automotive GmbH, Alfdorf (DE)

(72) Inventors: Wolfgang Holbein, Alfdorf (DE); Artur Klein, Lorch (DE)

(73) Assignee: TRW Automotive GmbH, Alfdorf (DE)

( * ) Notice: Subject to any disclaimer, the term of this patent is extended or adjusted under 35 U.S.C. 154(b) by 0 days.

(21) Appl. No.: 14/373,416

(22) PCT Filed: Jan. 16, 2013

(86) PCT No.: PCT/EP2013/000109
§ 371 (c)(1),
(2) Date: Sep. 10, 2014

(87) PCT Pub. No.: WO2013/110439
PCT Pub. Date: Aug. 1, 2013

(65) Prior Publication Data
US 2014/0375042 A1    Dec. 25, 2014

(30) Foreign Application Priority Data

Jan. 25, 2012 (DE) .......................... 10 2012 001 283

(51) Int. Cl.
*B60R 22/03* (2006.01)
*B60R 22/20* (2006.01)
*B60R 22/195* (2006.01)
*B60R 22/18* (2006.01)
*B60R 22/185* (2006.01)

(52) U.S. Cl.
CPC ................. *B60R 22/20* (2013.01); *B60R 22/03* (2013.01); *B60R 22/18* (2013.01); *B60R 22/185* (2013.01); *B60R 22/1952* (2013.01); *B60R 2022/1806* (2013.01)

(58) Field of Classification Search
CPC ........................................................ B60R 22/03
USPC .................................................. 254/394, 393
See application file for complete search history.

(56) References Cited

U.S. PATENT DOCUMENTS

2009/0302593 A1    12/2009    Grau et al.

FOREIGN PATENT DOCUMENTS

DE    10 2008 026 872    12/2009
WO    2006/010484    2/2006

*Primary Examiner* — Ruth Ilan
(74) *Attorney, Agent, or Firm* — Tarolli, Sundheim, Covell & Tummino, LLP

(57) ABSTRACT

A positioning device (12), especially for a vehicle seat belt feeder, comprises a flexible load-bearing element (16) and a molded part (18) comprising a plurality of molded elements (20) each of which annularly surrounds the elastic load-bearing element (16) and includes axial bearing surfaces. The axial bearing surfaces of the molded elements (20) include a surface structure which is configured so that two neighboring molded elements (20) loaded against each other contact each other with their axial bearing surfaces, are in positive engagement and are orientated in the radial direction at a defined position relative to each other, A belt buckle device (10) comprises an afore-described positioning device (12) as well as a belt buckle (14) that is fastened to the load-bearing element (16).

14 Claims, 3 Drawing Sheets

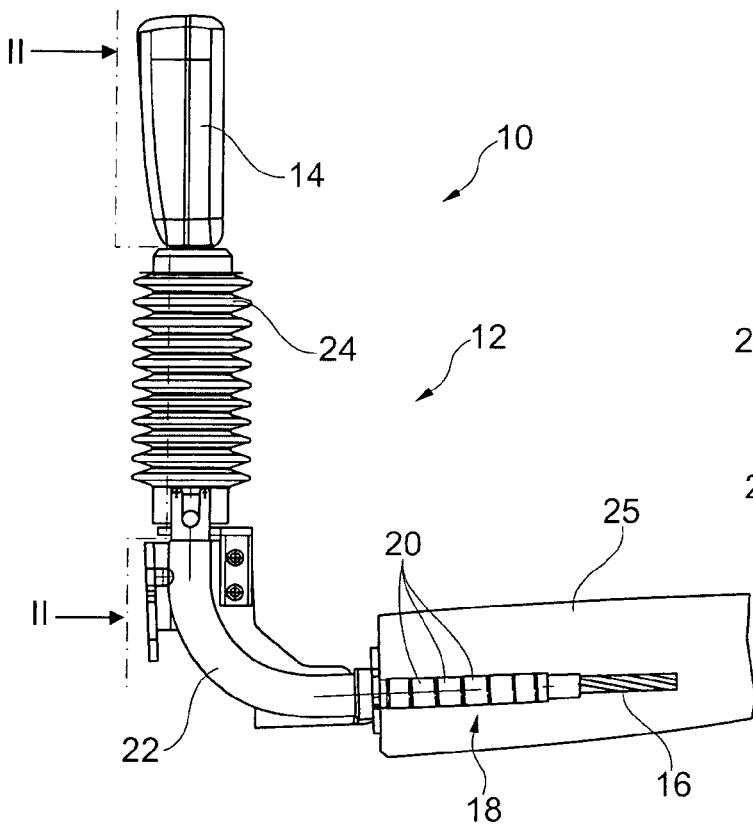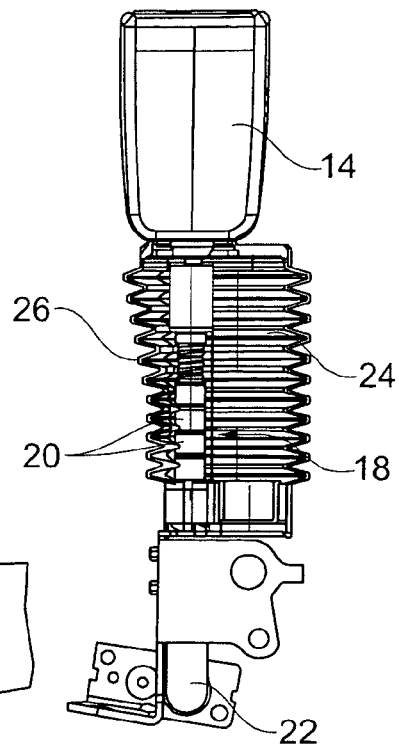
Fig. 1    Fig. 2
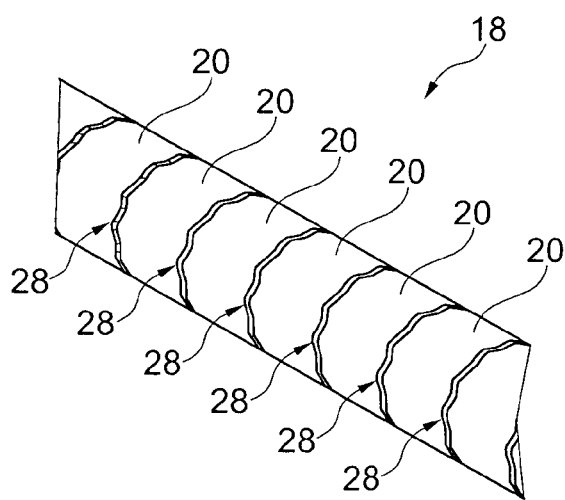
Fig. 3

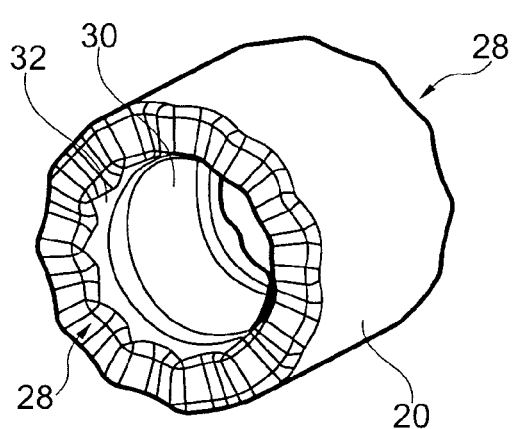
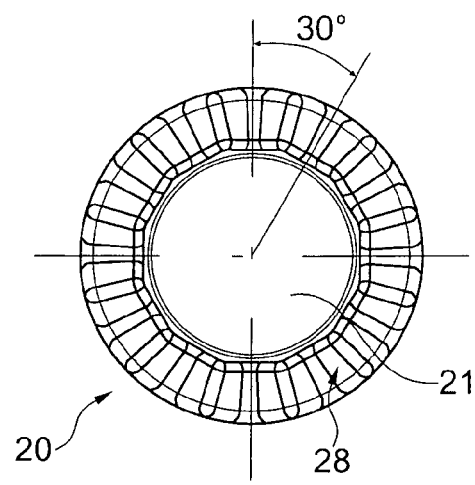
Fig. 4　　　　　Fig. 5
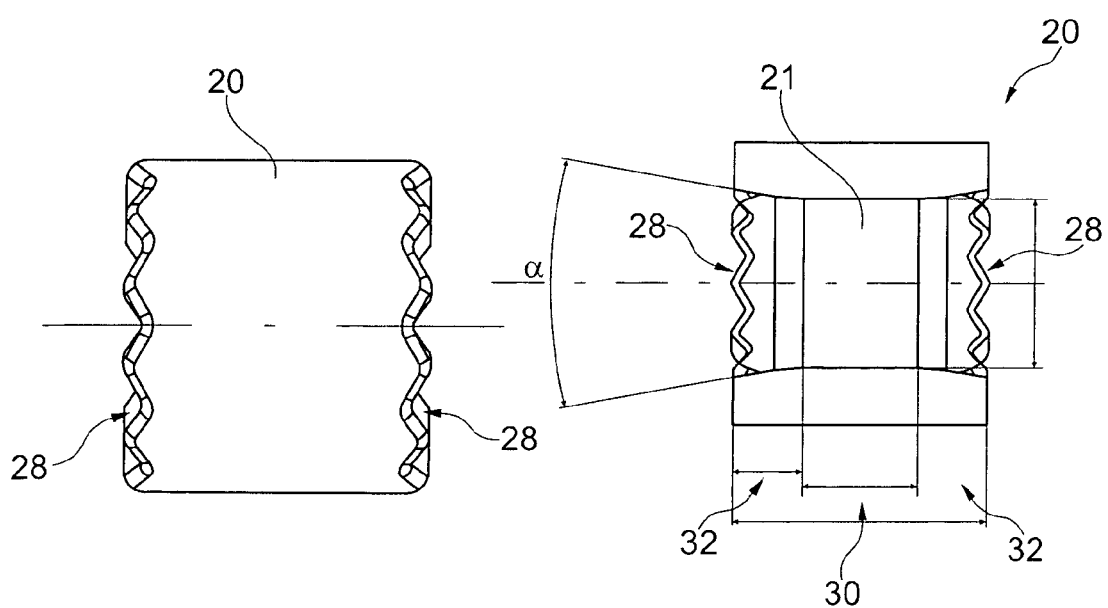
Fig. 6　　　　　Fig. 7

POSITION DEVICE, PARTICULARLY FOR A BELT FEEDER, AND BELT LOCK DEVICE

RELATED APPLICATIONS

This application corresponds to PCT/EP2013/000109, filed Jan. 16, 2013, which claims the benefit of German Application No. 10 2012 001 283.7, filed Jan. 25, 2012, the subject matter, of which are incorporated herein by reference in their entirety.

BACKGROUND OF THE INVENTION

The invention relates to a positioning device, especially for a vehicle seat belt feeder, comprising a flexible load-bearing element and a molded part including a plurality of molded elements each annularly surrounding the deformable load-bearing element and having axial bearing surfaces. The invention furthermore relates to a belt buckle device including such positioning device.

An afore-mentioned positioning device is known, for example, from DE 10 2008 026 872 A1. When in such positioning device the molded part is provided at least partially outside a holder, it is possible that not all molded elements are arranged in a way optimally centered relative to the load-bearing element. If said molded elements are pulled into the holder, they can abut against the holder due to the radial offset. In order to avoid wear on the positioning device and increased friction, the holder must have a funnel, for example, that permits centered orientation of the molded elements. Irrespective thereof, when the radially offset molded elements abut against the holder, an undesired noise may be caused.

SUMMARY OF THE INVENTION

It is the object of the invention to provide a positioning device that avoids the afore-mentioned drawbacks.

This is enabled in a generic positioning device in which the axial bearing surfaces of the molded elements have a surface structure configured so that two neighboring molded elements loaded against each other contact each other with their axial bearing surfaces, are in positive engagement and are orientated in the radial direction at a defined position relative to each other. The surface structure configured in this way allows to transform the force acting in the axial direction which loads the neighboring molded elements against each other at least partly into force components acting in the radial direction that orientate the two molded elements into the defined position in the radial direction relative to each other. The molded elements are threaded like beads onto the element and contact each other. The term belt feeder is intended to mean active units for moving the belt itself or the belt buckle more closely to the occupant so as to facilitate fastening and unfastening of the seat belt.

Preferably, when the neighboring molded elements are orientated, they are centered onto a joint axis.

For example, the surface structure of the bearing surfaces of the molded elements can have a star-shaped or concentric geometry, especially having an undulated surface. An axial component of the force can be transformed into a radial component by neighboring bearing surfaces contact each other by respective inclined surface portions.

The annular molded elements may include a duct through which the deformable load-bearing element extends.

Preferably a duct portion of a molded element includes an axial marginal area widened in funnel shape and having an opening angle preferably ranging from 10° to 30°. This enables increased mobility between the molded element and the load-bearing element.

It is possible that substantially all molded elements are uniformly configured or that respective neighboring molded elements are differently configured.

It is further possible for the molded elements to be formed symmetrically or asymmetrically and to be arranged in a directed way at the load-bearing element.

A holder may be provided which retains the molded part in a constrained configuration. In this way the molded part can be arranged in a space-saving manner in a retracted position. Said holder is especially a tube which is bent and through which the element including the molded element extends.

A force element exerting an axial force onto the molded part and force-loading the molded elements against each other can be provided.

For example, the flexible load-bearing element is a wire cable.

The object of the invention is further achieved by a belt buckle device comprising a positioning device as afore-described according to the invention and a belt buckle fastened to the load-bearing element.

BRIEF DESCRIPTION OF THE DRAWINGS

Further features and advantages of the invention result from the following description and from the drawings which are referred to and in which:

FIG. 1 shows a belt buckle device according to the invention;

FIG. 2 shows a sectional view of the belt buckle device of FIG. 1 along the sectional plane II-II;

FIG. 3 shows a detailed view of a molded part of a positioning device according to a first embodiment of the invention;

FIG. 4 shows a perspective view of a molded element of the molded part according to FIG. 3;

FIG. 5 shows an axial view of the molded element of FIG. 4;

FIG. 6 shows a side view of the molded element according to FIG. 4;

FIG. 7 shows a sectional view of the molded element according to FIG. 4;

DESCRIPTION OF EXEMPLARY EMBODIMENTS

Figure 8:
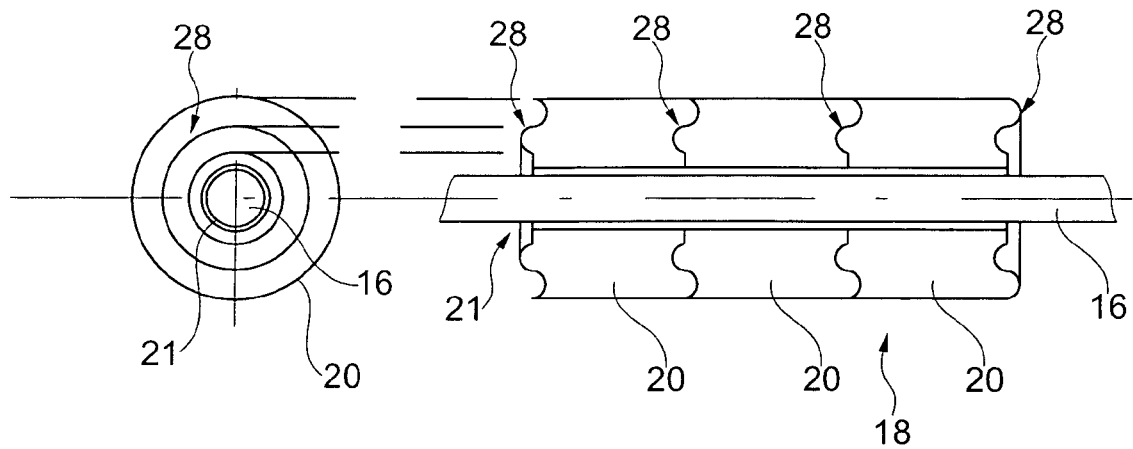
FIG. 8 shows a detailed view of a positioning device according to a second embodiment of the invention.

A vehicle belt buckle device 10 comprising a positioning device 12 and a belt buckle 14 is illustrated in FIGS. 1 and 2. In the shown embodiment the belt buckle device 10 is a vehicle belt buckle feeder. However, it is also possible, for instance, that the belt buckle device 10 is in the form of a belt tensioner or that the positioning device 12 moves the belt including the plug-in tongue toward the occupant so as to facilitate fastening and unfastening of the seat belt.

The positioning device 12 includes a flexible load-bearing element 16 in the form of a wire cable in the shown embodiment.

Furthermore, the positioning device 12 comprises a molded part 18 having a plurality of molded elements 20. The molded elements 20 take an annular shape and each has a centric duct portion 21. The duct portions 21 of the individual molded elements 20 jointly form a duct in which the load-bearing element 16 is accommodated.

The molded elements 20 are thus threaded like beads onto the element 16 and are not fastened directly to each other but are only axially adjacent to each other.

A tubular holder 22 can retain the molded part 18 in a constrained configuration, wherein in the shown embodiment the holder 22 is designed so that the molded part 18 is deflected by approx. 90° in an arc.

Between the holder 22 and the belt buckle 14 a bellows 24 is provided for covering and protecting the molded part 18 as far as it protrudes from the holder 22.

The belt buckle device 10 moreover includes a drive 25 schematically represented in the drawings for the purpose of clarity. The drive 25 acts on the end of the load-bearing element 16 facing away from the belt buckle 14 and enables the load-bearing element 16 to move along its axis. In this way a change of position of the belt buckle 14 is possible.

FIG. 2 illustrates a sectional view of the belt buckle device 10. In the area of the bellows 24 below the belt buckle 14 a plurality of molded elements 20 of the molded part 18 is provided outside the holder 22. The molded elements 20 are force-loaded against each other by a force element 26 in the form of a spring exerting an axial force onto the molded part 18. The molded elements 20 loaded against each other contact each other with their axial bearing surfaces, thereby the molded part 18 taking a defined configuration in the area outside the holder 22. In the shown embodiment the molded part 18 takes a rectilinear configuration. However, also other shapes, for example curved shapes could be provided. The deformable load-bearing element 16 accommodated in the annular duct of the molded elements 20 matches the shape of the molded part 18.

FIG. 3 illustrates a detailed view of the molded part 18 having molded elements 20 adjacent each other. The axial, i.e. front-face bearing surfaces 28 of the molded elements 20 have a surface structure which is configured so that two neighboring molded elements 20 loaded against each other are adjacent to each other with their axial bearing surfaces 28, are in positive engagement and are orientated relative to each other in the radial direction at a defined position. In the shown embodiment the neighboring molded elements 20 are orientated so that the molded elements 20 are centered onto a joint axis.

The geometry of the molded elements 20 will be explained hereinafter by way of the FIGS. 4 to 7. The axial bearing surfaces 28 of the molded element 20 have a star-shaped geometry which is formed by an undulated surface in the shown embodiment.

The molded element 20 is configured to be mirror-symmetric with respect to its central plane extending perpendicularly to the axis of the annular duct portion 21.

With respect to the central axis, the molded element 20 is rotationally symmetric, in the embodiment the "wave crests" are distanced at 30°.

In the first embodiment preferably all molded elements 20 of the molded part 18 are formed identically. The axial surfaces of the two outer molded elements 20 of the molded part 18 which have no neighboring molded elements can be designed in any other way.

When two molded elements 20 are arranged to be radially slightly offset, the two axial bearing surfaces 28 cannot optimally engage with each other, which can be the case especially at the transition of the bent portion of the holder 22 to the linear portion and outside the holder 22. The molded elements 20 are adjacent each other with respective inclined surface portions. As a result of the force loading the two neighboring molded elements 20 against each other, the two molded elements 20 are orientated relative to each other, however. Accordingly, the axial force component is transformed, due to the inclined adjacent surfaces, at least partly into a radial force component which causes the orientation of the two molded elements 20 relative to each other. At the defined position orientated relative to each other the axial bearing surfaces 28 can be completely adjacent to each other and no effective radial forces are active.

In the shown embodiment the star-shaped geometry comprises a round wave profile. Alternatively, also other geometries can be provided, for example in a triangular or sawtooth shape.

Due to the characteristics of symmetry, merely one single type of molded element 20 is required to form the molded part 18. Since the molded element 20 is mirror-symmetric, no particular orientation in the axial direction is necessary.

Neighboring molded elements 20 are rotated in each case about 30° (corresponding to the rotational symmetry) relative to each other.

FIG. 7 shows a sectional view of a molded element 20. The centric duct portion 21 includes a cylindrical area 30 and two axial marginal areas 32 widened in funnel shape which have an opening angle a comprised between 10° and 30°. The funnel-shaped marginal areas 32 allow better relative mobility between the molded element 20 and the load-bearing element 16 extending through the annular duct portion 21. The marginal areas 32 preferably extend between ⅓ and ¼ of the length of the annular duct portion.

FIG. 8 illustrates an alternative embodiment of the molded part 18, wherein a concentric geometry is provided instead of a star-shaped geometry, as is especially evident from the axial top view in the left-hand area of FIG. 8. In the shown embodiment the concentric geometry is configured to have a rounded wave shape.

On the left axial bearing surface 28 radially outside a circumferential groove is provided, while radially inside a radially circumferential bead is formed. The opposite axial bearing surface 28 is formed to be complementary thereto.

All molded elements 20 of the molded part 18 are identical. Contrary to the preceding embodiment, in the embodiment according to FIG. 8 the axial orientation of the molded elements 20 must be observed due to the lacking mirror symmetry.

The functioning of the molded part 18 of the second embodiment is analogous to the afore-described first embodiment. The orientation of the molded elements 20 relative to each other is enabled by transforming the axial force component into radial force components by contact surfaces of neighboring molded elements 20 obliquely adjacent to each other.

Figure 9:
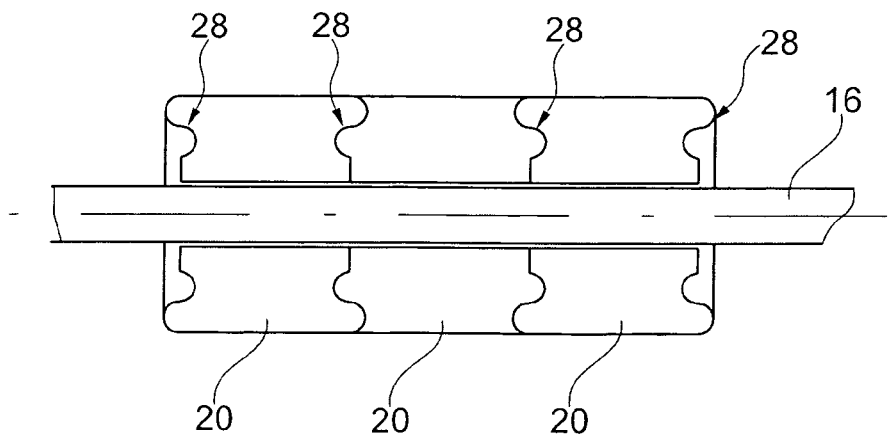
FIG. 9 shows a detailed view of a positioning device according to a third embodiment of the invention.

FIG. 9 shows a third embodiment of a molded part 18, wherein two differently configured molded elements 20 are alternately provided each time. Therefore no axial orientation of the individual molded parts 20 has to be observed.

The axial bearing surfaces 28 are configured analogously to the preceding embodiment in the form of concentric wave geometries.

The functioning is analogous to the preceding embodiments.

The invention claimed is:

1. A positioning device (12) for a vehicle seat belt buckle, comprising:
a flexible load-bearing element (16), a molded part (18) including a plurality of molded elements (20) each of which annularly surrounds the load-bearing element (16) and includes axial bearing surfaces (28), wherein the annular molded elements (20) have a central duct (21) through which the load-bearing element (16) extends, and wherein the axial bearing surfaces (28) of the molded elements (20) include a surface structure configured so that two neighboring molded elements (20) loaded against each other contact each other with their axial bearing surfaces (28), are in positive engagement and move relative to each other in the radial direction so as to be oriented at a defined position relative to each other.

2. The positioning device according to claim 1, wherein when orientating the neighboring molded elements (20) centers the neighboring molded elements (20) about a joint axis.

3. The positioning device according to claim 1, wherein the surface structure of the bearing surfaces (28) of the molded elements (20) has a star-shaped geometry including an undulated surface.

4. The positioning device according to claim 1, wherein a duct portion (21) of a molded element (20) has an axial marginal area (32) widened in funnel shape and exhibiting an opening angle of about 10° to about 30° with respect to the central axis.

5. The positioning device according to claim 1, wherein substantially all molded elements (20) are uniformly configured.

6. The positioning device according to claim 1, wherein the molded elements (20) are configured symmetrically and are arranged to be radially orientated relative to the load-bearing element (16).

7. The positioning device according to claim 1, further comprising a holder (22) including a bent tube through which the load-bearing element (16) including the molded elements (20) extends to retain the molded part (18) in a constrained configuration.

8. The positioning device according to claim 1, wherein a force element (26) is provided for exerting axial force onto the molded part (18) and force-loading the molded elements (20) axially against each other, and/or wherein the load-bearing element (16) is a wire cable.

9. The positioning device according to claim 1, wherein the surface structure of the bearing surfaces (28) of the molded elements (20) has a concentric geometry including an undulated surface.

10. The positioning device according to claim 1, wherein respective neighboring molded elements (20) are differently configured.

11. The positioning device according to claim 1, wherein the molded elements (20) are configured asymmetrically and are arranged to be radially orientated relative to the load-bearing element (16).

12. A positioning device for a vehicle seat belt buckle, comprising:

a flexible load-bearing element extending along a centerline;

a molded part including a plurality of molded elements that each includes a central duct through which the load-bearing element extends such that the molded elements annularly surround the load-bearing element, each molded element having an axial bearing surface including a surface structure contoured such that engagement and axial loading between the axial bearing surfaces of adjacent molded elements moves the adjacent molded elements radially relative to one another into a defined position about the centerline.

13. The positioning device according to claim 12, wherein axially loading adjacent molded elements radially moves the adjacent molded elements into positions centered on the centerline.

14. The positioning device according to claim 12, wherein the surface structure extends circumferentially about the centerline.

* * * * *